United States Patent
Jeevagunta et al.

(10) Patent No.: US 12,476,995 B2
(45) Date of Patent: Nov. 18, 2025

(54) AUTOMATIC DETECTION OF APPLICATION PROGRAMMING INTERFACE (API) ATTACK SURFACES

(71) Applicant: Cequence Security, Inc., Sunnyvale, CA (US)

(72) Inventors: Abraham Jeevagunta, San Jose, CA (US); Shreyans Mehta, Los Altos, CA (US)

(73) Assignee: Cequence Security, Inc., Sunnyvale, CA (US)

( * ) Notice: Subject to any disclaimer, the term of this patent is extended or adjusted under 35 U.S.C. 154(b) by 253 days.

(21) Appl. No.: 18/466,586

(22) Filed: Sep. 13, 2023

(65) Prior Publication Data

US 2024/0106852 A1     Mar. 28, 2024

Related U.S. Application Data

(60) Provisional application No. 63/375,491, filed on Sep. 26, 2022.

(51) Int. Cl.
*H04L 9/40*     (2022.01)
*G06F 9/54*     (2006.01)
(Continued)

(52) U.S. Cl.
CPC .......... *H04L 63/1433* (2013.01); *H04L 41/22* (2013.01); *G06F 9/547* (2013.01); *G06F 21/577* (2013.01)

(58) Field of Classification Search
CPC ... H04L 63/1433; H04L 41/22; G06F 21/577; G06F 9/547
See application file for complete search history.

(56) References Cited

U.S. PATENT DOCUMENTS

| 10,754,628 B2 * | 8/2020 | Hernan | G06F 8/73 |
| 11,265,342 B2 * | 3/2022 | Nikam | H04L 63/1466 |

(Continued)

OTHER PUBLICATIONS

Ariffin, Muhammad Azizi Mohd, Mohd Faisal Ibrahim, and Zolidah Kasiran. "API vulnerabilities in cloud computing platform: attack and detection." International Journal of Engineering Trends and Technology 1: 8-14. (Year: 2020).*

(Continued)

*Primary Examiner* — John M Macilwinen (57) ABSTRACT

Various embodiments facilitate uncovering an Application Programming Interface (API) attack surface for an organization. In some examples, an apparatus comprises storage media, a processing system, and program instructions stored on the storage media. The apparatus processes Domain Name System (DNS) data to determine a set of possible API servers. The apparatus determines a set of possible Uniform Resource Identifier (URI) paths that may lead to one or more actual API endpoints. The apparatus joins the set of possible API servers with the set of possible URI paths to generate a set of possible API Uniform Resource Locators (URLs). The apparatus performs an API-specific crawl of the set of possible API URLs by submitting API requests to the set of possible API URLs and analyzing responses to determine the one or more actual API endpoints and one or more actual API servers of the set of possible API servers.

20 Claims, 6 Drawing Sheets

(51) Int. Cl.
  *G06F 21/57*    (2013.01)
  *H04L 41/22*    (2022.01)

(56) References Cited

U.S. PATENT DOCUMENTS

| | | | |
|---|---|---|---|
| 2016/0267153 A1* | 9/2016 | Witkop | G06F 16/285 |
| 2018/0255089 A1* | 9/2018 | Wilton | H04L 63/1433 |
| 2020/0301674 A1* | 9/2020 | Swope | G06F 9/54 |
| 2020/0302050 A1* | 9/2020 | Jain | G06F 9/5072 |
| 2023/0093659 A1* | 3/2023 | O'Dell | G06F 9/54 |
| | | | 719/328 |
| 2023/0229539 A1* | 7/2023 | Krishan | G06F 16/955 |
| | | | 714/55 |

OTHER PUBLICATIONS

Maleshkova, Maria, Carlos Pedrinaci, and John Domingue. "Investigating web apis on the world wide web." 2010 eighth ieee european conference on web services. IEEE. (Year: 2010).*

O'Hare, Jamie, Rich Macfarlane, and Owen Lo. "Identifying vulnerabilities using internet-wide scanning data." 2019 IEEE 12th International Conference on Global Security, Safety and Sustainability (ICGS3). IEEE. (Year: 2019).*

* cited by examiner

AUTOMATIC DETECTION OF APPLICATION PROGRAMMING INTERFACE (API) ATTACK SURFACES

CROSS-REFERENCE TO RELATED APPLICATIONS

This U.S. patent application claims the benefit of and priority to U.S. Provisional Patent Application 63/375,491 titled, "AUTOMATIC DETECTION OF APPLICATION PROGRAMMING INTERFACE (API) ATTACH SURFACES" which was filed on Sep. 26, 2022, and which is hereby incorporated by reference into this U.S. patent application in its entirety.

TECHNICAL FIELD

Various embodiments of the present technology relate to web service security, and more specifically, to Application Programming Interface (API) attack surface detection.

BACKGROUND

Security of a web service is of upmost importance to both the operators of the website and its users. As more people utilize the Internet to communicate and conduct business transactions and other services, more threats to website security arise. Website owners, insurers, hosting services, and others involved in the provision of a web service typically strive to create a robust security infrastructure for a website to prevent nefarious individuals from compromising the site. However, despite these security precautions, a website could still be subject to intrusions by computer hackers, malware, viruses, and other malicious attacks. Websites may be vulnerable to security breaches for a variety of reasons, including security loopholes, direct attacks by malicious individuals or software applications, dependencies on compromised third-party providers, unintended data breaches, and other security threats. Security systems are employed by websites to counteract the wide range of threats.

Many web applications utilize Application Programming Interfaces (APIs) based applications for operations like sales productivity, collaboration, marketing automation, and project tracking. API usage has increased as organizations have expanded their use of microservices and created new cloud-native applications. The consumer facing applications that the organizations create are often API based. Additionally, most internet traffic today is API driven. This API ecosystem is fueled by increases in public cloud environments, Kubernetes environments, serverless environments, and use of third-party Software-As-A-Service (SaaS) systems. Developers can now roll out new API driven services in any environment. Critical information like personal information, financial information, health information, and the like is stored behind the applications that host these APIs. Malicious actors utilize these APIs as entry points to exfiltrate this information. However, it is difficult for security systems to counter malicious actors given the large and increasing number of APIs. Without knowledge of the existence of an API, a security system cannot effectively defend that API against malicious actors. Unfortunately, security systems do not effectively and efficiently inhibit malicious activity in APIs.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for web security. Some embodiments comprise a method to facilitate uncovering an Application Programming Interface (API) attack surface for an organization. The method comprises processing Domain Name System (DNS) data to determine a set of possible API servers associated with one or more domains. The method further comprises determining a set of possible Uniform Resource Identifier (URI) paths that may lead to one or more actual API endpoints provided by one or more of the set of possible API servers. The method further comprises joining the set of possible API servers with the set of possible URI paths to generate a set of possible API Uniform Resource Locators (URLs). The method further comprises performing an API-specific crawl of the set of possible API URLs by submitting API requests to the set of possible API URLs and analyzing responses to determine the one or more actual API endpoints and one or more actual API servers of the set of possible API servers.

Some embodiments comprise one or more non-transitory computer-readable storage media having program instructions stored thereon to facilitate uncovering an API attack surface for an organization. The program instructions, when executed by a computing system, direct the computing system to perform operations. The operations comprise processing DNS data to determine a set of possible API servers associated with one or more domains. The operations further comprise determining a set of possible URI paths that may lead to one or more actual API endpoints provided by one or more of the set of possible API servers. The operations further comprise joining the set of possible API servers with the set of possible URI paths to generate a set of possible API URLs. The operations further comprise performing an API-specific crawl of the set of possible API URLs by submitting API requests to the set of possible API URLs and analyzing responses to determine the one or more actual API endpoints and one or more actual API servers of the set of possible API servers.

Some embodiments comprise an apparatus to facilitate uncovering an API attack surface for an organization. The apparatus comprises one or more computer-readable storage media, a processing system operatively coupled with the one or more computer-readable storage media, and program instructions stored on the one or more computer-readable storage media. The program instructions, when executed by the processing system, direct the processing system to process DNS data to determine a set of possible API servers associated with one or more domains. The program instructions further direct the processing system to determine a set of possible URI paths that may lead to one or more actual API endpoints provided by one or more of the set of possible API servers. The program instructions further direct the processing system to join the set of possible API servers with the set of possible URI paths to generate a set of possible API URLs. The program instructions further direct the processing system to perform an API-specific crawl of the set of possible API URLs by submitting API requests to the set of possible API URLs and analyzing responses to determine the one or more actual API endpoints and one or more actual API servers of the set of possible API servers.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments disclosed herein provide attack surface visibility to enterprises so that they are aware of the all the API servers they have made publicly accessible and various types of risks associated with API servers. This knowledge enables enterprises to be able view all of their API servers, hosting provider distribution, detailed risks associated with each server, risk assessment periodically by providing weekly trend reports of their API servers, and promptly alerting the customers based on risk level. Now referring to the Figures.

Figure 1:
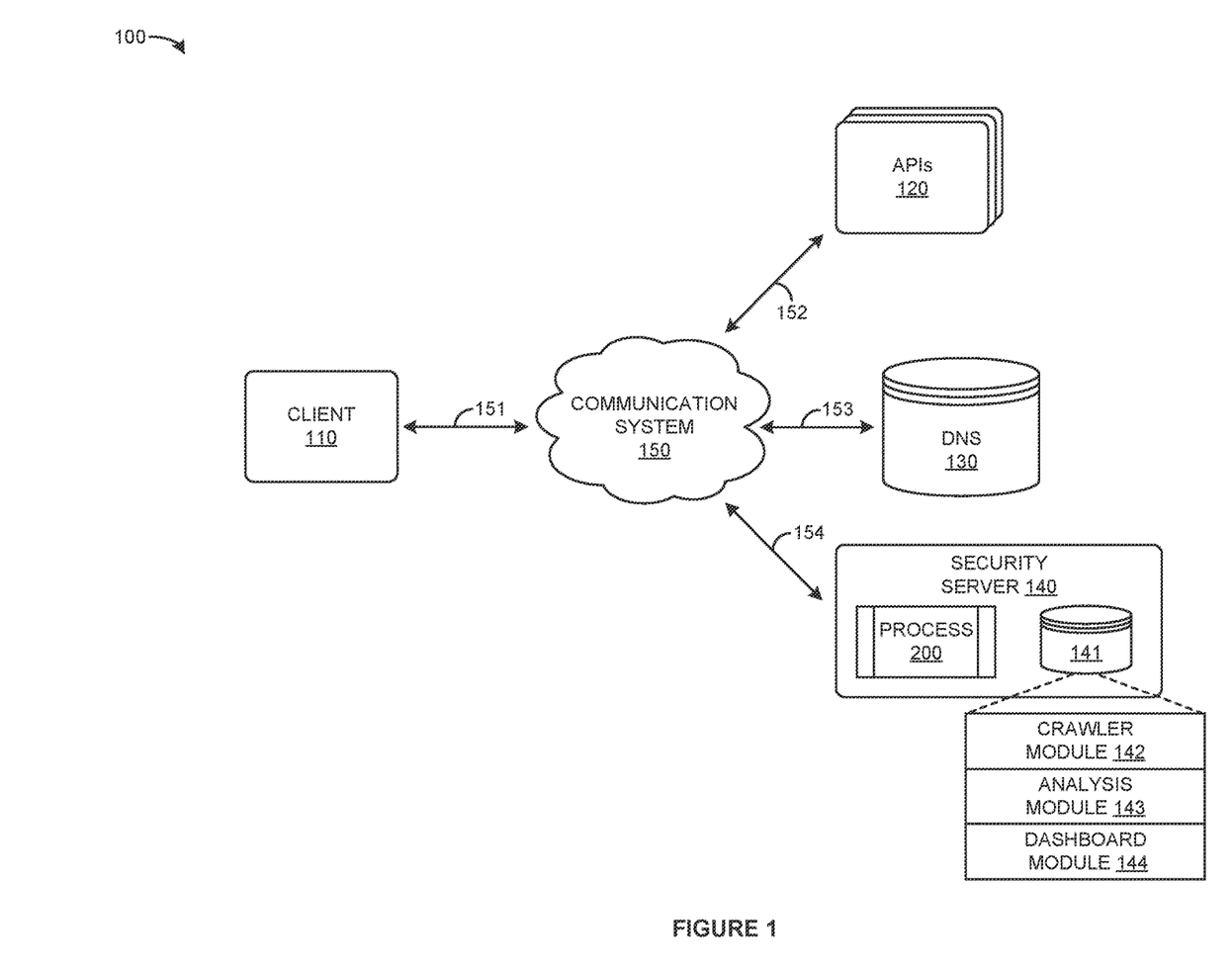
FIG. 1 illustrates a communication network to uncover Application Programming Interface (API) attack surfaces.

FIG. 1 illustrates communication network 100 to automatically detect Application Programming Interface (API) attack surfaces. Communication network 100 provides services like online networking, content distribution, web application services, web application security, and the like. Communication network 100 comprises client 110, APIs 120, Domain Name System (DNS) 130, security server 140, communication system 150, and communication links 151-154. Security server 140 comprises process 200 and modules 141. Modules 141 include crawler module 142, analysis module 143, and dashboard module 144. In other examples, communication network 100 may include fewer or additional components than those illustrated in FIG. 1. Likewise, the illustrated components of communication network 100 may include fewer or additional components, assets, or connections than shown. Each of client 110, APIs 120, DNS 130, security server 140, and communication system 150 may be representative of a single computing apparatus or multiple computing apparatuses.

Various examples, operations, and network configurations are presented herein. In some examples, security server 140 processes DNS data retrieved from DNS 130 (or associated DNS log systems) to determine a set of possible API servers associated with APIs 120. Security server 140 determines a set of possible Uniform Resource Identifier (URI) paths that may lead to one or more actual API endpoints provided by the set of possible API servers in APIs 120. Security server 140 joins the set of possible API servers with the set of possible URI paths to generate a set of possible API Uniform Resource Locators (URLs) that point towards potential endpoints in APIs 120. Security server 120 performs an API-specific crawl of the set of possible API URLs by submitting API requests to the set of possible API URLs in APIs 120. Existing endpoints in APIs 120 that receive the requests transfer API responses to security server 140. Security server 140 analyzes responses to determine the one or more actual API endpoints and one or more actual API servers of APIs 120.

Client 110 is representative of a client computing system that comprises a processing system and communication transceiver. Client 110 may also include other components such as a user interface, data storage system, and power supply. Examples of client 110 include mobile computing devices, such as cell phones, tablet computers, laptop computers, notebook computers, and gaming devices, as well as any other type of mobile computing devices and any combination or variation thereof. Examples of client 110's computing system also include desktop computers, server computers, and virtual machines, as well as any other type of computing system, variation, or combination thereof. Client 110 may load and execute a web browser to communicate with DNS 130 and access APIs 120 over communication system 150. The computing system of client 110 may reside in a single device or may be distributed across multiple devices and may be a discrete system or could be integrated within other systems, including other systems within communication network 100. In some examples, the computing system of client 110 could comprise a web server, Content Distribution Network (CDN), reverse proxy, load balancer, middleware, cloud server, network switch, router, switching system, packet gateway, network gateway system, Internet access node, application server, database system, service node, firewall, or some other communication system, including combinations thereof.

APIs 120 are representative of a set of API servers, computing systems, and/or network equipment configured to provide services and web resources to client 110. For example, APIs 120 may comprise a system that provides a cloud-based web service to client 110. APIs 120 may comprise client-side APIs and server-side APIs. APIs 120 may be representative of any computing apparatus, system, or systems that may connect to another computing system over a communication network. APIs 120 comprise a processing system and communication transceiver. APIs 120 may also include other components such as routers, data storage systems, and power supplies. APIs 120 may reside in a single device or may be distributed across multiple devices. APIs 120 may comprise discrete systems or may be integrated within other systems, including other systems within communication network 100. Some examples of computing systems that host APIs 120 include database systems, server computers, cloud computing platforms, hybrid-cloud computing platforms, and virtual machines, as well as any other type of computing system, variation, or combination thereof.

The API servers can be in various different environments—cloud, Kubernetes, serverless, data center, and the like. The actual API server name then points to these environments. Client 110 looks up the IP address associated with the API server name using the DNS protocol. Based on the hierarchy of the DNS name, the DNS server for that subdomain can be managed by more than one team in the organization. For example, a.dev.acme.com can be managed by a different group within the organization from a.prod.acme.com. The DNS servers may also support wildcard resolutions where *.uat.acme.com can all point to some standard IP address or a name entry and thus an API server name like a.uat.acme.com may never have an entry in the DNS server but can still be resolved to an API server IP address.

DNS 130 may be provided by any computing apparatus, system, or systems that may connect to another computing system over a communication network to provide domain name services to client 110. For example, client 110 may query DNS 130 with a Uniform Resource Locator (URL) address request for an endpoint for one of APIs 120 and DNS 130 may return an Internet Protocol (IP) address the corresponds to the requested URL. Client 110 may utilize the returned IP address to contact the desired API server of APIs 120. The computing apparatus of DNS 130 may comprise storage systems and include components like a processing system, storage system, router, server, and power supply. DNS 130 may reside in a single device or may be distributed across multiple devices. DNS 130 may be provided by a discrete system or may be provided by multiple systems, including other systems within communication network 100. DNS 130 stores a data structure (e.g., DNS entries) that maps URL addresses for APIs 120 to the IP address of APIs 120. The data structure of DNS 130 may store additional entries that map to IP addresses that are not API servers. For example, the additional entries may map to IP addresses for email servers, SSH servers, web servers, and the like. DNS 130 may comprise active and passive DNS sources. An active DNS source comprises one or more DNS servers. A passive DNS source comprises a DNS log aggregation service that collects all DNS logs from client requests across all the publicly available DNS servers of DNS 130. When client 110 makes a DNS request, the request may get logged at all the publicly available DNS servers as DNS is a recursive protocol.

Security server 140 is representative of one or more computing devices configured to identify API attack surfaces in communication network 100. APIs 120 may provide access points for malicious actors to attack an organization associated with APIs 120. For an API to be effectively guarded against such attacks, enterprise security teams must know of the existence of the API. Security server 140 may comprise a server, a cloud computing system, or any other computing system, network equipment, apparatus, system, or systems that may connect to another computing system over a communication network. Security server 140 comprises a processing system and communication transceiver. Security server 140 may also include other components such as a router, server, data storage system, and power supply.

Security server 140 may reside in a single device or may be distributed across multiple devices. Security server 140 may be a discrete system or may be integrated within other systems, including other systems within communication network 100. Some examples of security server 140 includes database systems, desktop computers, server computers, cloud computing platforms, and virtual machines, as well as any other type of computing system, variation, or combination thereof.

Figure 2:
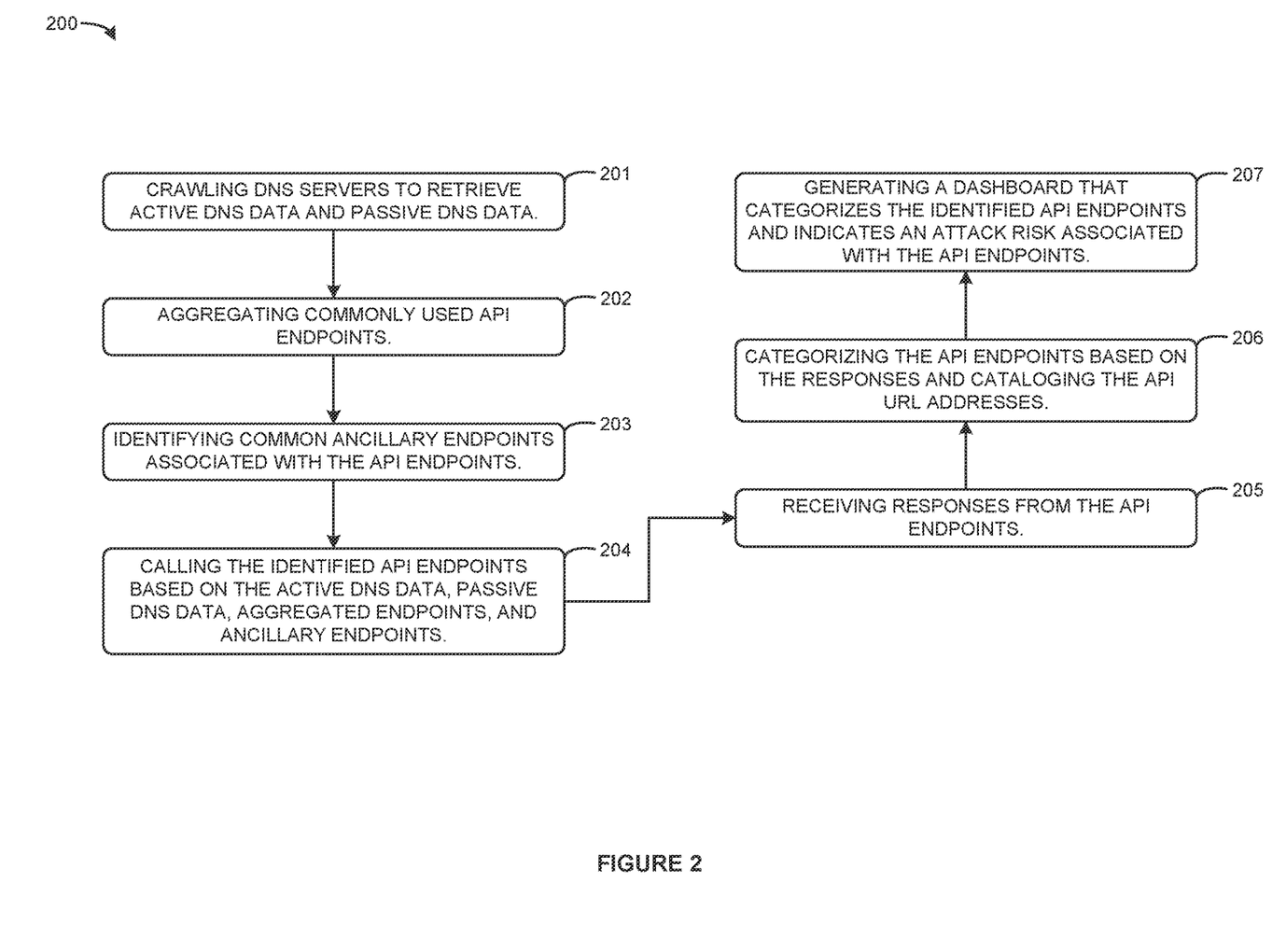
FIG. 2 illustrates an exemplary operation of the communication network to uncover API attack surfaces.

In some examples, security server 140 is configured to implement process 200 described in FIG. 2. Security server 140 may be configured to execute software modules 142-144 to identify API attack surfaces in APIs 120. Crawler module 142 is configured to crawl APIs 120 and DNS 130 to collect DNS data from active and passive DNS sources, aggregate commonly used API endpoints in APIs 120, and determine ancillary API endpoints associated with APIs 110. In some examples, crawler module 142 may retrieve DNS data from active and passive DNS sources, starting with the top-level domain(s) for an organization. Crawler module 142 determines API endpoints and paths for APIs 120 based on commonly used API endpoints found in publicly available open API specifications. Crawler module 142 determines ancillary endpoints that typically exist with these APIs even though they are not documented in API specifications. Examples of ancillary endpoints include /api/health, /api/version, /api/metrics, and the like. Crawler module 142 determines additional API endpoints based on documented open API specifications of an organization from their development teams and runtime environments. Crawler module 142 transfers API requests to different API URLs based on the active DNS data, passive DNS data, and the API endpoint data. Analysis module 143 is configured to determine the security risk for the API endpoints determined by crawler module 142. Analysis module 143 analyzes the responses to categorize the APIs into REST, GraphQL, SOAP, and the like or into non-API traffic. Analysis module 143 weeds out the non-API traffic and catalogues the API URLs. Analysis module 143 may perform the previous steps to include fuzzing and pen-test variants of the request to uncover additional risks on those endpoints. Dashboard module 144 is configured to generate a visual representation that characterizes the identified API endpoints and the security risk associated with the endpoints.

Communication system 150 could comprise multiple network elements such as routers, gateways, telecommunication switches, servers, processing systems, or other communication equipment and systems for providing communication and data services. In some examples, communication system 150 could comprise wireless communication nodes, telephony switches, Internet routers, network gateways, computer systems, communication links, or some other type of communication equipment, including combinations thereof. Communication system 150 may also comprise optical networks, packet networks, local area networks (LAN), metropolitan area networks (MAN), wide area networks (WAN), or other network topologies, equipment, or systems, including combinations thereof. Communication system 150 may be configured to communicate over wired or wireless communication links. Communication system 150 may be configured to use Internet Protocol (IP), Ethernet, optical networking, wireless protocols, communication signaling, or some other communication format, including combinations thereof. In some examples, communication system 150 includes further access nodes and associated equipment for providing communication services to several computer systems across a large geographic region.

The computing systems of client 110, APIs 120, DNS 130, security server 140, and communication system 150 comprise microprocessors, software, memories, transceivers, bus circuitry, and the like. The microprocessors comprise Central Processing Units (CPU), Graphical Processing Units (GPU), Application-Specific Integrated Circuits (ASIC), Field Programmable Gate Array (FPGA), and/or types of processing circuitry. The memories comprise Random Access Memory (RAM), flash circuitry, disk drives, and/or the like. The memories store software like operating systems, security modules, user applications, web applications, and browser applications. The microprocessors retrieve the software from the memories and execute the software to drive the operation of communication network 100 as described herein. Communication links 151-154 that connect the elements of communication network 100 use metallic links, glass fibers, radio channels, or some other communication media. The communication links use communication protocols like Internet Protocol (IP), General Packet Radio Service Transfer Protocol (GTP), Time Division Multiplex (TDM), Data Over Cable System Interface Specification (DOCSIS), Institute of Electrical and Electron Engineers (IEEE) 802.11 (WiFi), IEEE 802.3 (Ethernet), virtual switching, inter-processor communication, bus interfaces, and/or some other data communication protocols. Client 110, APIs 120, DNS 130, security server 140, and communication system 150 may exist as unified computing devices or may be distributed between multiple computing devices.

In some examples, communication network 100 implements process 200 illustrated in FIG. 2. It should be appreciated that the structure and operation of communication network 100 may differ in other examples.

FIG. 2 illustrates process 200. Process 200 comprises an automated process to detect API attack surfaces. Process 200 may be implemented in program instructions in the context of any of the software applications, module components, or other such elements of one or more computing devices. The program instructions direct the computing devices(s) to operate as follows, referred to in the singular for the sake of clarity.

The operations of process 200 comprise crawling DNS servers to retrieve active DNS data and passive DNS data (step 201). The operations further comprise aggregating commonly used API endpoints (step 202). The operations further comprise identifying common ancillary endpoints associated with the API endpoints (step 203). The operations further comprise calling the identified API endpoints based on the active DNS data, passive DNS data, aggregated endpoints, and ancillary endpoints (step 204). The operations further comprise receiving responses from the API endpoints (step 205). The operations further comprise categorizing the API endpoints based on the responses and cataloguing the API URL addresses (step 206). The operations further comprise generating a dashboard that categorizes the identified API endpoints and indicates an attach risk associated with the API endpoints (step 207).

Referring back to FIG. 1, communication network 100 includes a brief example of process 200 as employed by one or more applications hosted by security server 140. The operation may differ in other examples.

In operation, client 110 transfers a DNS request to DNS 130 over communication system 150 to access one of APIs 120. The request may comprise a URL address that points to an API endpoint of APIs 120 that client 110 wants to access. DNS 130 translates the request into an IP address for the requested one of APIs and transfers the IP address for delivery to client 110 over communication system 150. Client 110 receives the IP address and uses the IP address to begin communications with the requested one of APIs 120. For example, the requested API may return desired information to client 110. DNS 130 logs the DNS request from client 110 in storage. DNS 130 repeats the above process with other clients (not illustrated) to build a DNS log from API client requests across all publicly available DNS systems. For example, a DNS log aggregation service associated with DNS 130 may store DNS log data for API requests received by DNS 130 and other DNS systems to build a comprehensive DNS log of API client requests.

Security server 140 executes crawler module 142 to discover all API attack surfaces in APIs 120 associated with a domain or company (step 201). Security server 140 may execute crawler module 142 in response to an operator request. For example, security server 140 may receive a domain or company name to discover attack surface via a user interface system from a human operator and responsively execute crawler module 142. Alternatively, security server 140 may automatically execute crawler module 142. For example, security server 140 may execute crawler module 142 based on a schedule loaded to server 140. Crawler module 142 transfers crawl requests for domains associated with APIs 120. For example, the crawl requests may be addressed for commonly used API endpoints in APIs 120. Crawler module 142 transfers a crawl request to DNS 130 and downloads DNS logs of API client requests. Crawler module 142 identifies commonly used API paths to aggregate endpoints associated with APIs 120 based on the API client requests (step 202). For example, crawler module 142 may interact with DNS 130 to retrieve IP addresses for known API servers and derive Uniform Resource Indicators (URIs) for API services that might exist based on the received DNS data. Crawler module 142 identifies ancillary endpoints associated with APIs 120 (step 203). For example, crawler module 142 may generate API crawl requests using headers like monitoring, health, APIs, exposed files, OpenAPI, Swagger, GraphQL, or other types of common API paths. Crawler module 142 transfers crawl requests for delivery to APIs 120 using the commonly used API paths and the identify ancillary endpoints associated with APIs 120 (step 204). In some examples, crawler module 142 may inject vulnerability finding specific headers, query parameters, and post body parameters into crawl requests to identify security relevant information for APIs 120.

DNS 130 and APIs 120 respond to the crawl requests with the requested information. For example, crawler module 142 may download the requested information from DNS 130 and APIs 120. Security server 140 receives the response to the crawl requests (step 205). The responses to the crawl requests may be captured as Hypertext Transfer Protocol Web Archive (HAR) files. Security server 140 executes analysis module 143 to categorize the responses to the crawl requests (step 206). For example, analysis module 143 may process file created events and analyze the HAR file to find various risk categories for ones of APIs 120. The risk categories include factors like exposed files, unhandled, monitoring, health, OpenAPI, Swagger, GraphQL, insecure, non-production, origin servers, and the like. Analysis module 143 identifies ones of APIs 120 that have security vulnerabilities. For example, analysis module 143 may determine API servers with log4j vulnerabilities. Analysis module 143 may determine if any log4j vulnerable API servers make remote Java Naming and Directory Interface (JNDI) calls and processes the JNDI calls to determine security vulnerabilities, malicious calls, and the like.

Security server 140 executes dashboard module 144 to generate a dashboard that categorizes the identified API endpoints and indicates an attach risk associated with the API endpoints. Dashboard module 144 generates a dashboard that categorizes the identified API endpoints and indicates an attach risk associated with the API endpoints (step 207). The dashboard may comprise one or more textual and visual indicators, user selectable options, or other types of Graphical User Interface (GUI) elements to indicate the analyzed data to identify the API endpoints of APIs 120 and an attack risk for vulnerable ones of the API endpoints. Dashboard module 144 may transfer notifications to external systems to indicate security risks. For example, dashboard module 144 may drive transceiver circuitry in security server 140 to transfer the notifications to external systems like Email, JIRA, Slack and any Webhook.

Advantageously, security server 140 effectively and efficiently detects API attack surfaces. Moreover, security server 140 identifies security risks for the identified API attack surfaces and generates dashboard reports to notify operators of the identified API attack surfaces and security risks.

Figure 3:
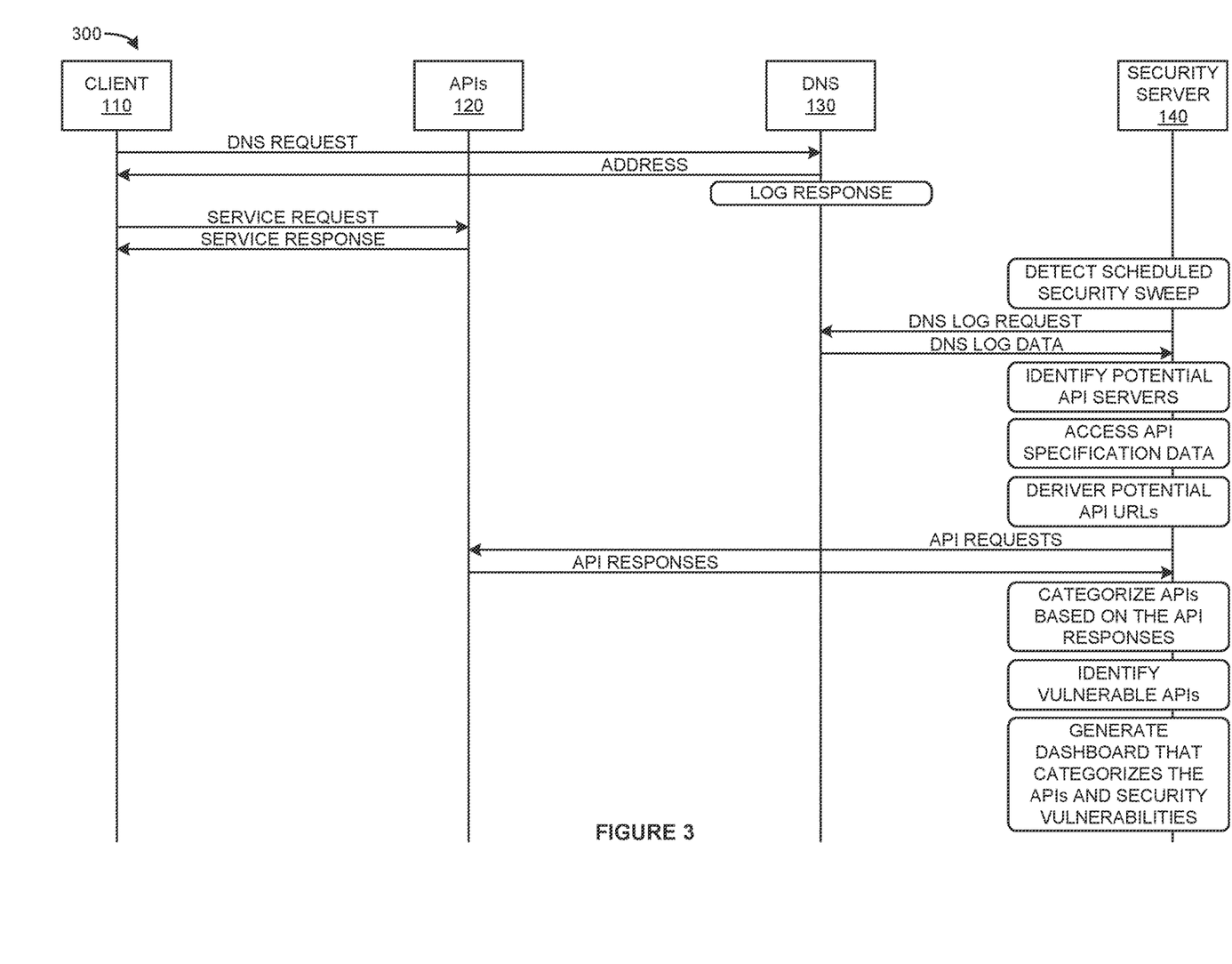
FIG. 3 illustrates an exemplary operation of the communication network to uncover API attack surfaces.

FIG. 3 illustrates process 300. Process 300 comprises an exemplary operation of communication network 100 to automatically uncover API attack surfaces. Process 300 is an example of process 200 illustrated in FIG. 2, however process 200 may differ. In some examples, client 110 transfers a DNS request for one or more of APIs 120 to DNS 130. DNS 130 maps the requested API (e.g., API URL) to an IP address. DNS 130 returns the IP address(es) for the requested API to client 110. DNS logs the client request, API URL, and IP address in memory. For example, DNS 130 may utilize a DNS log aggregation service to log API (or other) requests received from client 110. Client 110 uses the IP address provided by DNS 130 to interact with APIs 120.

Security server 140 detects a scheduled security sweep for APIs 120. For example, security server 140 may be loaded with a schedule to identify attack surfaces in APIs 120 once a day, once a week, or on some other time scale. Security server 140 retrieves active and passive DNS data from DNS 130. For example, security server 140 may query DNS servers associated with the organization that hosts APIs 120 to obtain active DNS data and may query a DNS log aggregation service for DNS 130 to obtain passive DNS data. The active and passive DNS data indicates IP addresses of ones of APIs 120 requested by client devices (e.g., client 110). Security server 140 processes the active and passive DNS data to identify a set of possible API servers in APIs 120.

Security server 140 accesses publicly available API specifications and responsively determines API Uniform Resource Identifiers (URIs) (e.g., API endpoints) that may lead to one or more actual servers in APIs 120. For example, security server 140 may identify common API endpoints in APIs 120 based on the API specifications. Security server 140 derives ancillary API URIs like api/health, /api/version, /api/metrics, and the like based on the API URIs indicated in the API specifications. Security server 140 joins the DNS data that indicates the set of possible API servers with the API URIs to form API URLs that may point to API servers in APIs 120.

Security server 140 generates and transfers API requests to APIs 120 (and potentially other network locations) using the URLs to determine the existence of all endpoints in APIs 120. Security server 140 receives and categorizes the responses from APIs 120. For example, security server 140 may categorize API responses by type (e.g., REST, GraphQL, SOAP, or non-API traffic) and catalog the API URLs. Security server 140 detects any security vulnerabilities in the identified API endpoints. For example, security server 140 may append log4j specific information to the API requests sent to the URLs to uncover vulnerable ones of APIs 120. Once the attack surfaces and security vulnerabilities are determined, security server 140 generates a dashboard to render the data for review. For example, security server 140 may render a user interface that catalogs each endpoint in APIs 120 and that indicates vulnerable endpoints.

Figure 4:
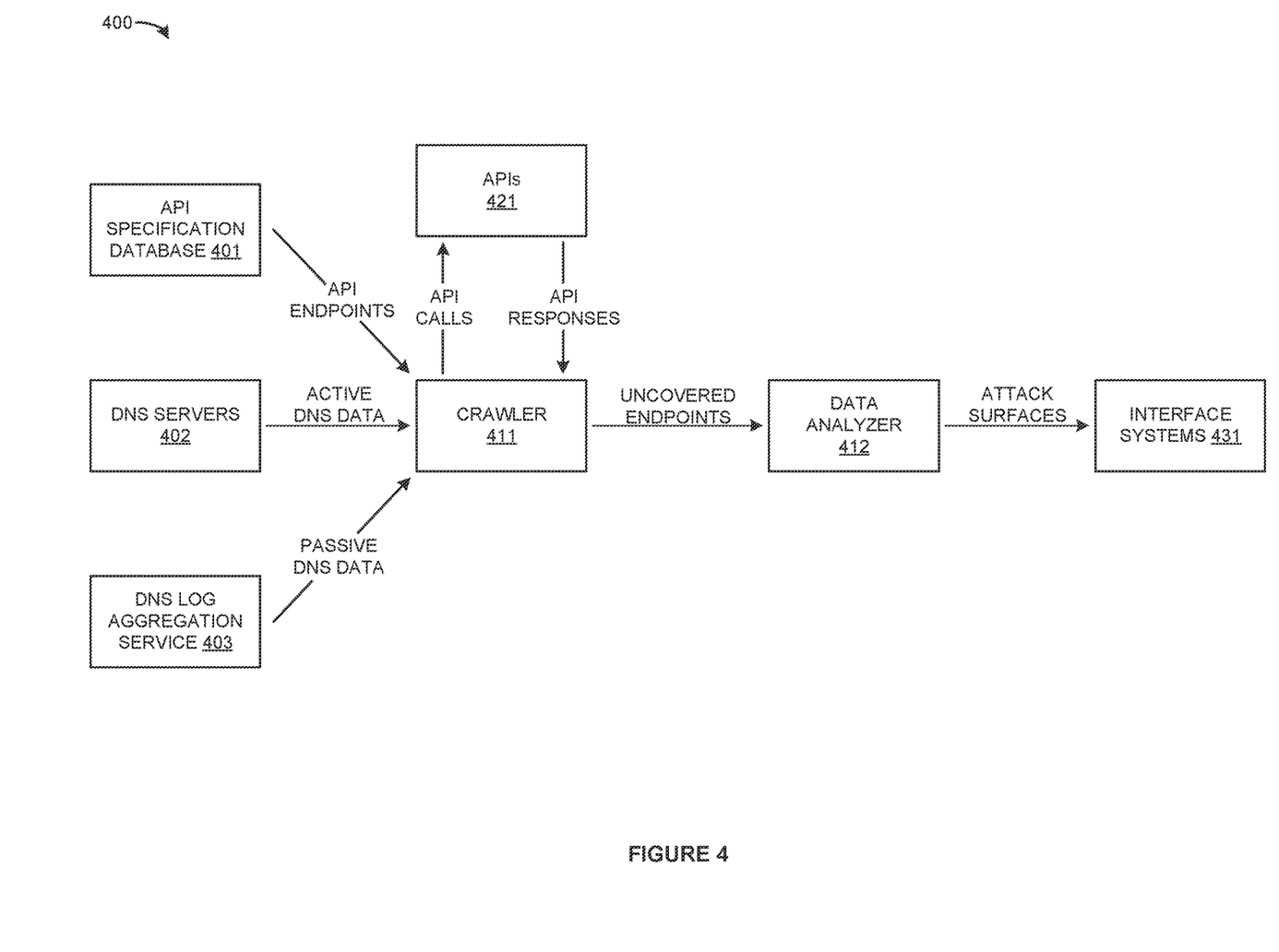
FIG. 4 illustrates an exemplary computing network to uncover API attack surfaces.

FIG. 4 illustrates computing environment 400 to automatically detect API attack surfaces. Environment 400 comprises an example of communication network 100 illustrated in FIG. 1, however network 100 may differ. Environment 400 comprises API specification database 401, DNS servers 402, DNS log aggregation service 403, crawler 411, data analyzer 412, APIs 421, and interface systems 431. In other examples, environment 400 may include fewer or additional components than those illustrated in FIG. 1. Likewise, the illustrated components of environment 400 may include fewer or additional components, assets, or connections than shown. Each of API specification database 401, DNS servers 402, DNS log aggregation service 403, crawler 411, data analyzer 412, APIs 421, and interface systems 431, and communication system 150 may be representative of a single computing apparatus or multiple computing apparatuses.

In some examples, crawler 411 queries API specification database 401 for API endpoint information, queries DNS servers 402 for active DNS data, and queries DNS log aggregation server 403 for passive DNS data. API specification database 401 returns known endpoints (e.g., API URIs) in APIs 421 to crawler 411. DNS servers 402 return active DNS data (e.g., IP addresses that are potentially associated with APIs 421) to crawler 411. DNS log aggregation service 403 returns passive DNS data (e.g., logged DNS requests for APIs 421) to crawler 411. Crawler 411 infers ancillary API endpoints based on the API endpoints indicated by database 401. Crawler 411 combines the API endpoint data with the active and passive DNS data to form API URLs that may potentially point to ones of APIs 421. For example, a portion of the API URLs may point to actual endpoints that exist in APIs 421 while another portion of the API URLs may not point to actual endpoints in APIs 421.

Crawler 411 transfers API calls to APIs 421 using the API URLs derived from API endpoint data, the active DNS data, and the passive DNS data. Crawler 411 appends log4j vulnerability finding specific headers, query parameters, post body parameters, and the like to the API calls to uncover security vulnerabilities in APIs 421. The extant endpoints in APIs 421 receive the calls from crawler 411 and accordingly transfer API responses to crawler 411. Crawler 411 indicates the API endpoints and security relevant API response data to data analyzer 412. Data analyzer 412 catalogs each endpoint in APIs 421 based on the responses and processes the security relevant API response data (e.g., log4j vulnerabilities) to identify vulnerable API endpoints. Analyzer 412 transfers the API endpoint catalog and security vulnerabilities to interface systems 431. Interface system 431 renders a dashboard (or some other type of user interface) to present the cataloged API endpoints and any detected security vulnerabilities for review by a human operator.

Figure 5:
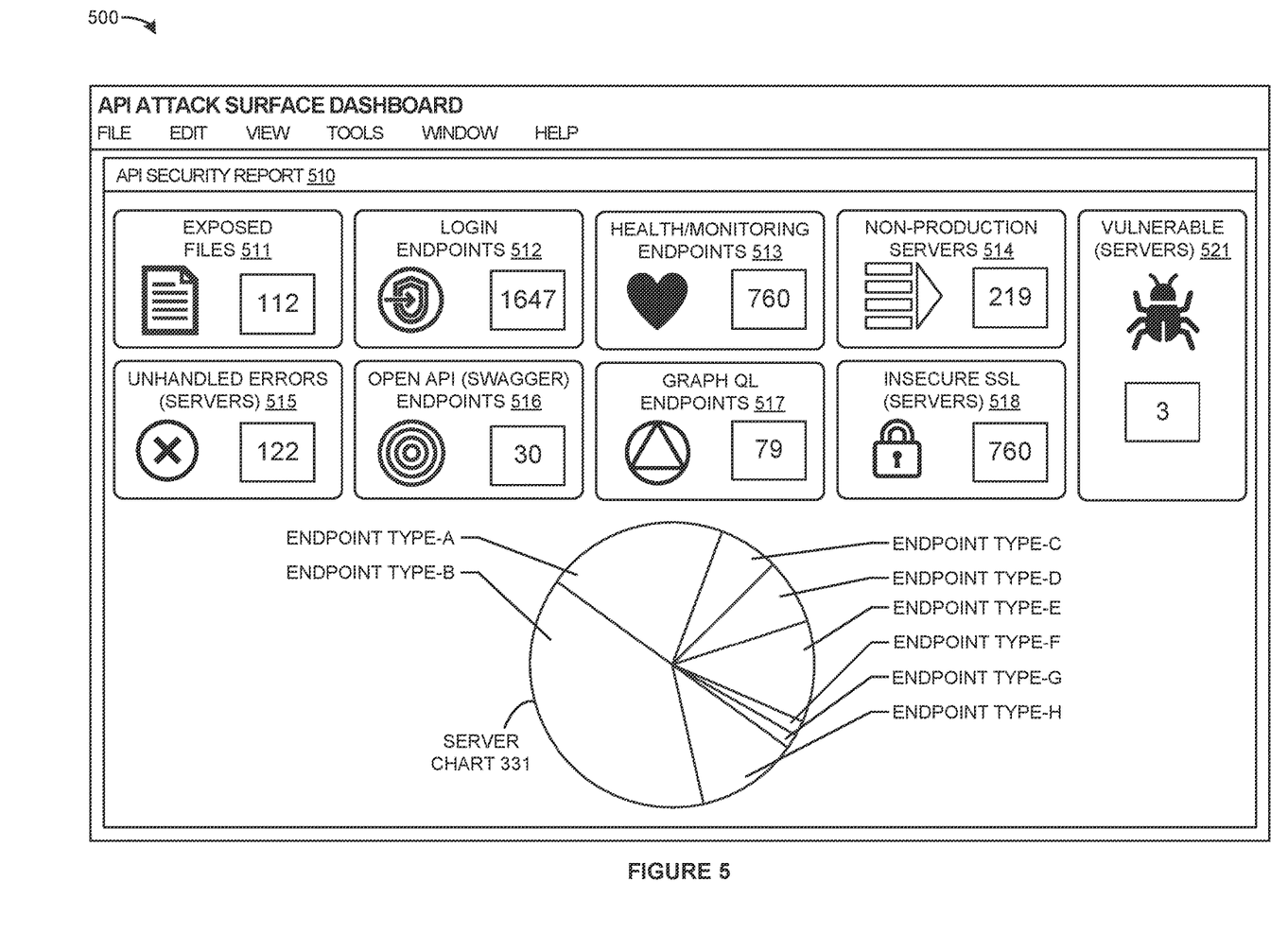
FIG. 5 illustrates an exemplary user interface to uncover API attack surfaces.

FIG. 5 illustrates user interface 500 to identify API attack surfaces according to an embodiment of the present technology. For example, communication network 100 may implement process 200 to generate user interface 500 illustrated in FIG. 5. In other examples, user interface 500 may differ. User interface 500 may be displayed on devices like a user computer, tablet computer, smartphone, and the like. User interface 500 comprises a GUI configured to allow a user to view an API security report for a web application. The GUI provides visualizations to identify all API attack surfaces for an organization or domain and indicates API servers with security vulnerabilities. In other examples, the GUI of user interface 500 may differ.

User interface 500 comprises API security report 510. For example, user interface 500 may present a selectable option that, in response to user action, drives user interface 500 to display API security report 510. In some examples, the computing device displaying user interface 500 may receive a hyperlink (e.g., via email) that links to API security report 500. User interface 500 may present the hyperlink on the display system of the computing device. A user may select the hyperlink which drives the computing device to download and display API security report 510 on interface 500 for review by a user.

API security report 510 comprises visual indicators 511-518, vulnerability indicator 521, and server chart 531. Visual indicators 511-518 characterize identified API endpoints by type and by number. In this example, visual indicators 511-518 comprise exposed filed 511, login endpoints 512, health/monitoring endpoints 513, non-production servers 514, unhandled server errors 515, open API swagger endpoints 516, GraphQL endpoints 517, and insecure SSL servers 518. In other examples, API security report 510 may comprise different, fewer, or additional visual indicators to categorize identified API endpoints. Vulnerability indicator 521 indicates the number of identified API endpoints that comprise security vulnerabilities like log4j vulnerabilities. Server chart 531 comprises a pie chart to categorize the proportion of API server endpoints by type. In this example, server chart 531 categorizes endpoints of type-A to type-H. In other examples, chart 531 may differ.

Figure 6:
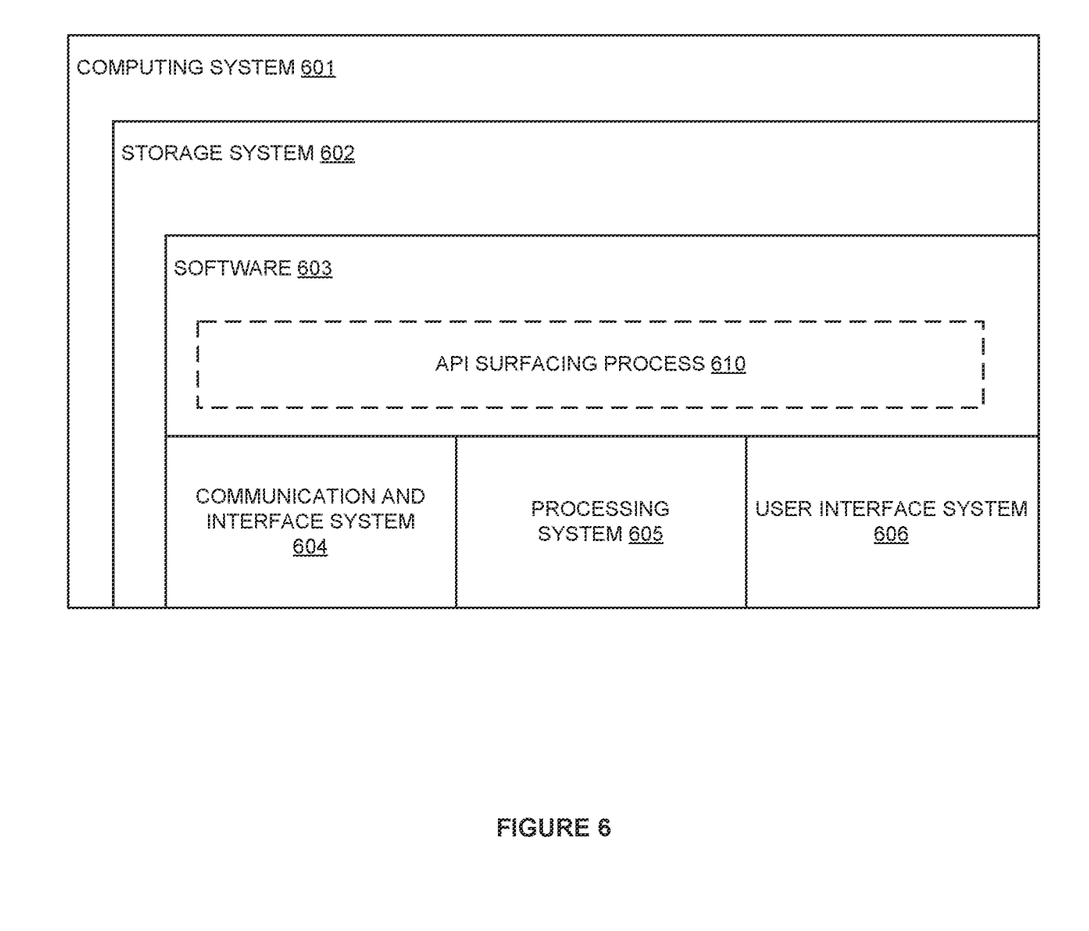
FIG. 6 illustrates an exemplary computing device to uncover API attack surfaces.

FIG. 6 illustrates computing device 601 which is representative of any system or collection of systems in which the various processes, programs, services, and scenarios disclosed herein to identify API attack surface may be implemented. For example, computing device 601 may be representative of client 110, APIs 120, DNS 130, security server 140, communication system 150, database 401, DNS servers 402, DNS log aggregation service 403, crawler 411, data analyzer 412, APIs 421, interface systems 431, user interface 500, and/or any other computing device contemplated herein. Examples of computing system 601 include, but are not limited to, server computers, routers, web servers, cloud computing platforms, and data center equipment, as well as any other type of physical or virtual server machine, physical or virtual router, container, and any variation or combination thereof.

Computing system 601 may be implemented as a single apparatus, system, or device or may be implemented in a distributed manner as multiple apparatuses, systems, or devices. Computing system 601 includes, but is not limited to, storage system 602, software 603, communication and interface system 604, processing system 605, and user interface system 606. Processing system 605 is operatively coupled with storage system 602, communication interface system 604, and user interface system 606.

Processing system 605 loads and executes software 603 from storage system 602. Software 603 includes and implements API surfacing process 610, which is representative of the processes to identify API attack surfaces and alert when API endpoints comprise security vulnerabilities as described in the preceding Figures. For example, API surfacing process 610 may be representative of process 200 illustrated in FIG. 2 and/or process 300 illustrated in FIG. 3. When executed by processing system 605, software 603 directs processing system 605 to operate as described herein for at least the various processes, operational scenarios, and sequences discussed in the foregoing implementations. Computing system 601 may optionally include additional devices, features, or functionality not discussed here for purposes of brevity.

Processing system 605 may comprise a micro-processor and other circuitry that retrieves and executes software 603 from storage system 602. Processing system 605 may be implemented within a single processing device but may also be distributed across multiple processing devices or sub-systems that cooperate in executing program instructions. Examples of processing system 605 include general purpose central processing units, graphical processing units, application specific processors, and logic devices, as well as any other type of processing device, combinations, or variations thereof.

Storage system 602 may comprise any computer readable storage media that is readable by processing system 605 and capable of storing software 603. Storage system 602 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 602 may also include computer readable communication media over which at least some of software 603 may be communicated internally or externally. Storage system 602 may be implemented as a single storage device but may also be implemented across multiple storage devices or sub-systems co-located or distributed relative to each other. Storage system 602 may comprise additional elements, such as a controller capable of communicating with processing system 605 or possibly other systems.

Software 603 (including API surfacing process 610) may be implemented in program instructions and among other functions may, when executed by processing system 605, direct processing system 605 to operate as described with respect to the various operational scenarios, sequences, and processes illustrated herein. For example, software 603 may include program instructions for crawling API and DNS systems, identifying API attack surfaces, and generating dashboards to characterize the API attack surfaces and security vulnerabilities for API endpoints as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 603 may include additional processes, programs, or components, such as operating system software, virtualization software, or other application software. Software 603 may also comprise firmware or some other form of machine-readable processing instructions executable by processing system 605.

In general, software 603 may, when loaded into processing system 605 and executed, transform a suitable apparatus, system, or device (of which computing system 601 is representative) overall from a general-purpose computing system into a special-purpose computing system customized to automatically detect API attack surfaces as described herein. Indeed, encoding software 603 on storage system 602 may transform the physical structure of storage system 602. The specific transformation of the physical structure may depend on various factors in different implementations of this description. Examples of such factors may include, but are not limited to, the technology used to implement the storage media of storage system 602 and whether the computer-storage media are characterized as primary or secondary storage, as well as other factors.

For example, if the computer readable storage media are implemented as semiconductor-based memory, software 603 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 604 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of computing devices to detect API attack surfaces, it should be understood that the systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method to facilitate uncovering an Application Programming Interface (API) attack surface for an organization, the method comprising:
    processing Domain Name System (DNS) data to determine a set of possible API servers associated with one or more domains;

determining a set of possible Uniform Resource Identifier (URI) paths that may lead to one or more actual API endpoints provided by one or more of the set of possible API servers;

joining the set of possible API servers with the set of possible URI paths to generate a set of possible API Uniform Resource Locators (URLs); and performing an API-specific crawl of the set of possible API URLs by submitting API requests to the set of possible API URLs and analyzing responses to determine the one or more actual API endpoints and one or more actual API servers of the set of possible API servers.

2. The method of claim 1 wherein processing the DNS data comprises crawling DNS servers to retrieve active DNS data and passive DNS data to determine the set of possible API servers associated with the one or more domains.

3. The method of claim 1 wherein determining the set of possible URI paths that may lead to the one or more actual API endpoints comprises aggregating commonly used API endpoints.

4. The method of claim 3 wherein determining the set of possible URI paths that may lead to the one or more actual API endpoints comprises identifying common ancillary API endpoints associated with the commonly used API endpoints.

5. The method of claim 4 wherein performing the API-specific crawl of the set of possible API URLs by submitting the API requests to the set of possible API URLs comprises submitting the API requests to the commonly used API endpoints and the common ancillary API endpoints.

6. The method of claim 1 further comprising:
categorizing the one or more actual API endpoints and the one or more actual API servers of the set of possible API servers based on the responses; and
determining the attack risk associated with the one or more actual API endpoints and one or more actual API servers.

7. The method of claim 6 further comprising generating data to render a user interface that categorizes the one or more actual API endpoints and one or more actual API servers and that indicates an attack risk associated with the one or more actual API endpoints and the one or more actual API servers.

8. One or more non-transitory computer-readable storage media having program instructions stored thereon to facilitate uncovering an Application Programming Interface (API) attack surface for an organization, wherein the program instructions, when executed by a computing system, direct the computing system to perform operations, the operations comprising:

processing Domain Name System (DNS) data to determine a set of possible API servers associated with one or more domains;

determining a set of possible Uniform Resource Identifier (URI) paths that may lead to one or more actual API endpoints provided by one or more of the set of possible API servers;

joining the set of possible API servers with the set of possible URI paths to generate a set of possible API Uniform Resource Locators (URLs); and performing an API-specific crawl of the set of possible API URLs by submitting API requests to the set of possible API URLs and analyzing responses to determine the one or more actual API endpoints and one or more actual API servers of the set of possible API servers.

9. The one or more non-transitory computer-readable storage media of claim 8 wherein processing the DNS data comprises crawling DNS servers to retrieve active DNS data and passive DNS data to determine the set of possible API servers associated with the one or more domains.

10. The one or more non-transitory computer-readable storage media of claim 8 wherein determining the set of possible URI paths that may lead to the one or more actual API endpoints comprises aggregating commonly used API endpoints.

11. The one or more non-transitory computer-readable storage media of claim 10 wherein determining the set of possible URI paths that may lead to the one or more actual API endpoints comprises identifying common ancillary API endpoints associated with the commonly used API endpoints.

12. The one or more non-transitory computer-readable storage media of claim 11 wherein performing the API-specific crawl of the set of possible API URLs by submitting the API requests to the set of possible API URLs comprises submitting the API requests to the commonly used API endpoints and the common ancillary API endpoints.

13. The one or more non-transitory computer-readable storage media of claim 8 wherein the operations further comprise:
categorizing the one or more actual API endpoints and the one or more actual API servers of the set of possible API servers based on the responses; and
determining an attack risk associated with the one or more actual API endpoints and the one or more actual API servers.

14. The one or more non-transitory computer-readable storage media of claim 13 wherein the operations further comprise:
generating data to render a user interface that categorizes the one or more actual API endpoints and the one or more actual API servers and indicates the attack risk associated with the one or more actual API endpoints and the one or more actual API servers.

15. An apparatus to facilitate uncovering an Application Programming Interface (API) attack surface for an organization, the apparatus comprising:
one or more computer-readable storage media;
a processing system operatively coupled with the one or more computer-readable storage media; and
program instructions stored on the one or more computer-readable storage media that, when executed by the processing system, direct the processing system to at least:
process Domain Same System (DNS) data to determine a set of possible API servers associated with one or more domains;
determine a set of possible Uniform Resource Identifier (URI) paths that may lead to one or more actual API endpoints provided by one or more of the set of possible API servers;
join the set of possible API servers with the set of possible URI paths to generate a set of possible API Uniform Resource Locators (URLs); and
perform an API-specific crawl of the set of possible API URLs by submitting API requests to the set of possible API URLs and analyze responses to determine the one or more actual API endpoints and one or more actual API servers of the set of possible API servers.

16. The apparatus of claim 15 wherein the program instructions direct the processing system to crawl DNS servers to retrieve active DNS data and passive DNS data to determine the set of possible API servers associated with the one or more domains.

17. The apparatus of claim 15 wherein the program instructions direct the processing system to aggregate commonly used API endpoints to determine the set of possible URI paths that may lead to the one or more actual API endpoints.

18. The apparatus of claim 17 wherein the program instructions direct the processing system to identify common ancillary API endpoints associated with the commonly used API endpoints to determine the set of possible URI paths that may lead to the one or more actual API endpoints.

19. The apparatus of claim 18 wherein the program instructions direct the processing system to submit the API requests to the commonly used API endpoints and the common ancillary API endpoints to perform the API-specific crawl of the set of possible API URLs by submitting the API requests to the set of possible API URLs.

20. The apparatus of claim 15 wherein the program instructions further direct the processing system to:
- categorize the one or more actual API endpoints and the one or more actual API servers of the set of possible API servers based on the responses;
- determine an attack risk associated with the one or more actual API endpoints and the one or more actual API servers; and
- generate data to render a user interface that categorizes the one or more actual API endpoints and the one or more actual API servers and indicates the attack risk associated with the one or more actual API endpoints and the one or more actual API servers.

* * * * *